US012673473B2

(12) United States Patent　(10) Patent No.: US 12,673,473 B2
Van Merksteijn　(45) Date of Patent: Jul. 7, 2026

(54) METHOD FOR CONSTRUCTING THE TREAD OF A TIRE, DEVICE CONFIGURED FOR PERFORMING THE METHOD AND UNCURED RUBBER STRIP

(71) Applicant: VM Holding B.V., Hengelo (NL)

(72) Inventor: Jacobus Lambertus Van Merksteijn, Hengelo (NL)

(73) Assignee: VM Holding B.V., Hengelo (NL)

( * ) Notice: Subject to any disclaimer, the term of this patent is extended or adjusted under 35 U.S.C. 154(b) by 198 days.

(21) Appl. No.: 18/033,527

(22) PCT Filed: Oct. 20, 2021

(86) PCT No.: PCT/NL2021/050633

§ 371 (c)(1),
(2) Date: Apr. 24, 2023

(87) PCT Pub. No.: WO2022/086324

PCT Pub. Date: Apr. 28, 2022

(65) Prior Publication Data

US 2023/0398756 A1　Dec. 14, 2023

(30) Foreign Application Priority Data

Oct. 22, 2020　(NL) ...................................... 2026728

(51) Int. Cl.
B29D 30/68　(2006.01)
B29D 30/58　(2006.01)

(52) U.S. Cl.
CPC ............. B29D 30/68 (2013.01); B29D 30/58 (2013.01)

(58) Field of Classification Search
CPC ........ B29D 30/52; B29D 30/58; B29D 30/60; B29D 30/68; B29D 2030/685
(Continued)

(56) References Cited

U.S. PATENT DOCUMENTS

| 4,221,253 | A | * | 9/1980 | Seiberling | .......... | B29D 30/0005 |
| | | | | | | 156/273.5 |
| 5,668,731 | A | * | 9/1997 | Mancosu | ........... | B23K 26/0823 |
| | | | | | | 219/121.68 |

(Continued)

FOREIGN PATENT DOCUMENTS

| CN | 110126318 A | 8/2019 |
| DE | 3541126 A1 | 5/1987 |

(Continued)

OTHER PUBLICATIONS

Kastens Sven, DE 102014223163 A1, machine translation. (Year: 2016).*

(Continued)

*Primary Examiner* — Sedef E Paquette
(74) *Attorney, Agent, or Firm* — Farber LLC

(57) ABSTRACT

Disclosed herein is a method for constructing the tread of a tyre, comprising of: a) arranging a plurality of layers of uncured rubber with a layer thickness per layer of between 30 and 500 pm on a base (20); b) removing material from the layers for the purpose of arranging a predetermined pattern; and c) at least partially separately curing each layer. The present invention also relates to a device to perform said method and to an uncured rubber strip, suitable for use in said method.

16 Claims, 3 Drawing Sheets

(58) Field of Classification Search
USPC .................. 152/209.1; 156/127, 128.1, 128.6
See application file for complete search history.

(56)                     References Cited

U.S. PATENT DOCUMENTS

| | | | | |
|---|---|---|---|---|
| 6,151,959 | A | * | 11/2000 | Cantu ...................... B60C 11/12 |
| | | | | 73/146 |
| 2013/0213539 | A1 | * | 8/2013 | Christenbury ..... B29D 30/0681 |
| | | | | 152/209.1 |
| 2015/0107734 | A1 | * | 4/2015 | Rey .................... B60C 11/0041 |
| | | | | 156/128.6 |
| 2020/0055237 | A1 | * | 2/2020 | Haidet .................. B29C 64/165 |

FOREIGN PATENT DOCUMENTS

| | | | | |
|---|---|---|---|---|
| DE | 102014223163 | A1 | | 5/2016 |
| EP | 0005899 | A1 | * | 12/1979 |
| JP | 07040459 | A | * | 2/1995 |
| JP | 2001179848 | A | * | 7/2001 |
| JP | 2010052453 | A | | 3/2010 |
| JP | 2017159460 | A | * | 9/2017 |
| WO | 2012057742 | A1 | | 5/2012 |
| WO | 2013176675 | A1 | | 11/2013 |
| WO | 2017086575 | A1 | | 5/2017 |

OTHER PUBLICATIONS

Muramatsu R, JP-2001179848-A, machine translation. (Year: 2001).*
Ono S, JP-2017159460-A, machine translation. (Year: 2017).*
Iwata N, JP-07040459-A, machine translation. (Year: 1995).*

* cited by examiner

METHOD FOR CONSTRUCTING THE TREAD OF A TIRE, DEVICE CONFIGURED FOR PERFORMING THE METHOD AND UNCURED RUBBER STRIP

FIELD OF THE INVENTION

The invention relates to a method for constructing the tread of a tyre.

BACKGROUND OF THE INVENTION

Tyres are used to cover the rim of wheels of vehicles, more specifically motor vehicles such as cars, aircraft, motorbikes and agricultural vehicles, or for instance bicycles. They are filled with air in order to improve travel comfort. Rotation of the wheel causes the tread of the tyre to move over a contact surface, more particularly a road surface. As a result hereof the tyre will wear over time, this having an adverse effect on its operation. At a certain moment the wear will have advanced to the extent that this tyre no longer meets requirements and this used tyre is therefore discarded and replaced with a new tyre.

In that case there is only a limited number of uses for discarded used tyres. It is thus known to shred used tyres into granulate. This granulate is used as infill in artificial grass fields. Due to the large number of vehicles on which tyres are used, the supply of used tyres is many times greater than the limited number of possible applications thereof. For this reason a large part of the used tyres will still end up in an incinerator. This way of processing used tyres has a particularly great environmental impact, and is therefore undesirable.

At the moment the tread of tyres is produced by means of extrusion of rubber to form a profile. After curing, this profile is arranged on a carcass with the other parts of the tyre thereon. It is per se known to add additives to the rubber in order to influence the mechanical properties of the tyre and more particularly the tread. The existing options however provide insufficient options for influencing the properties of the tyre and/or the tread thereof.

It is an object of the invention to reduce the environmental impact of used tyres. It is a further object of the invention to provide a method which provides more flexibility in constructing a tyre, more particularly the tread of the tyre.

SUMMARY OF THE INVENTION

This object is achieved with a method for constructing the tread of a tyre, comprising of:

arranging a plurality of layers of uncured rubber with a layer thickness per layer of between 30 and 500 μm on a base;

removing material from the layers for the purpose of arranging a predetermined pattern; and at least partially separately curing each layer.

Because the material is here arranged in layers with a layer thickness of between 30 and 500 μm, it is possible after the layer has been arranged to arrange the pattern in this layer with relatively little effort, for instance so that the pattern extends throughout the layer, i.e. from the base (or a previous layer arranged thereon) to the outer side. Such a layer thickness particularly makes it possible to utilize techniques such as laser ablation for this purpose, although the method is in principle not limited thereto. The curing is necessary here in order to have the rubber layer take on a character which makes it suitable to fulfil the role of tread and/or to obtain rigidity for fixation of a subsequent layer.

Removal is in principle not limited to a specific method. Examples of removal methods which can be envisaged are for instance water-jet cutting and laser ablation. This latter is clearly preferred here because water-jet cutting can for instance result in residues which may prevent adhesion of possible subsequent layers, while this is not the case, or less so, with laser ablation.

A profile can for instance be formed in the finally obtained tyre by means of the removal.

Curing is the creation of cross-links between monomer chains by having the uncured rubber react with for instance sulphur. The way in which the curing further takes place here is further in principle not limited to a specific method. Curing of the layer can here for instance take place at an increased layer temperature, such as a layer temperature of between 150° C. and 250° C.

As stated, each layer is cured separately, or at least partially cured, in step c). Partial curing must in this context be understood to mean that the conversion of the uncured rubber is not maximal, such as for instance a maximum of 30% or a maximum of 50% or a maximum of 70% of the maximum.

Between the different layers it is optionally possible to make use of an adhesive layer to further strengthen the adhesion between the layers. An adhesive can for instance comprise solute, this comprising uncured rubber and a solvent such as petrol.

The layers are here with great preference arranged over the full width of the base. It is however possible to vary the degree to which they are arranged at different width positions, as will be elucidated on the basis of a number of the following preferred embodiments.

Because relatively thin layers of rubber are used, use can for instance be made of UV-curing rubber. This is not possible in known production methods for tyres, because the rubber is too thick therefor. UV-curing rubber can be cured relatively rapidly, and particularly be cured locally in simple manner. The use of UV-curing rubber therefore contributes to the selective curing, but also or alternatively to the speed at which the method can be performed.

In a preferred embodiment of the method according to the invention step a) comprises of wrapping the base multiple times with one strip for the purpose of forming the plurality of layers.

Arranging the plurality of layers by wrapping the base with one strip, and in this way thus wrapping the same strip round the base multiple times, simplifies and accelerates arranging of the layers, which simplifies the process of arranging. All arranged layers will in practice generally be formed by one strip, although it is also an option to arrange a plurality of strips on the base in this way.

In a preferred embodiment of the method according to the invention the strip comprises a start and end zone, of which at least one zone has a layer thickness decreasing relative to the layer thickness.

It is important that the tread of the tyre is as smooth as possible, with the exception of a pattern optionally arranged in the layer. In order to prevent a protrusion from resulting in the layers at the point where the strip starts and/or where the strip ends it is advantageous to have the layer thickness of the strip decrease relative to the above stated layer thickness in a start zone and/or an end zone. This is preferably in one or both cases a linear decrease to a thickness of (almost) zero.

In a preferred embodiment of the method according to the invention the removal takes place by means of laser ablation.

The use of a laser ablation for the removal is here preferred over other methods because laser ablation is a relatively clean method which does not contaminate the arranged layer, or does so only to limited extent, as compared to for instance water-jet cutting.

In a preferred embodiment of the method according to the invention the removal of material from a layer takes place prior to a subsequent layer optionally being arranged over this layer.

When removal of material from a layer takes place prior to curing of this specific layer, the material can be removed from the layer more easily because it is easier to process than an already cured layer.

In a preferred embodiment of the method according to the invention step c) takes place after step b).

When the layer is therefore cured only after the pattern has been arranged, the part to be removed from the layer need not be cured first, this resulting in a saving in the energy consumption of the method.

In a preferred embodiment of the method according to the invention the rubber strip is in step a) arranged from a carrier, preferably a film, particularly a polyester film.

It is preferred to arrange the rubber strip from a carrier in order to prevent the uncured layer—which has an adhesive character—from sticking to equipment for arranging of the strip and/or processing of the strip on the base. A film is here advantageous because the rubber layer can be easily rolled up together with the film and transported therewith. Polyester (for instance in the form of a fabric or a film) is greatly preferred here because this type of film is able to withstand the pressures with which the layer of uncured rubber is generally arranged on the base.

It is preferred to arrange the rubber strip from a carrier in order to prevent the uncured layer—which has an adhesive character—from sticking to equipment for arranging of the strip and/or processing of the strip on the base. A film is here advantageous because the rubber layer can be easily rolled up together with the film and transported therewith. Polyester (for instance in the form of a fabric or a film) is greatly preferred here because this type of film is able to withstand the pressures with which the layer of uncured rubber is generally arranged on the base.

Providing a surface structure in at least a part of the layers, preferably all the layers except the external surface of the final product, makes a subsequent layer better able to adhere to the layer provided with the surface structure. As seen from the base with a layer arranged thereon, this can (in each case) be the side of the arranged layer which is directed toward a subsequent layer and/or the side of a subsequent layer which is directed toward the arranged layer.

In the case that it is arranged in the layer, a surface structure is always superficial and so not arranged through the layer, while the above stated pattern generally does extend throughout the layer, although this is not always necessary either.

In a preferred embodiment of the method according to the invention the surface structure is chosen such that an external surface is increased.

A surface structure which increases the external surface of the layer, for instance in that grooves or protrusions are provided on the layer, is a particularly suitable way of increasing the adhesion of subsequent layers. A non-limitative example of such a surface structure is a micro-zigzag structure, which can take the form of both protrusion and/or grooves. Micro-zigzag structure is understood to mean that the structure has a characteristic dimension of for instance 50-300 micrometres.

In a preferred embodiment of the method according to the invention a side of the carrier directed toward the layer defines a negative of the surface structure.

By arranging in the carrier a pattern which defines a negative of the desired surface structure it is no longer necessary to arrange this surface structure separately, this accelerating the method for constructing the tread.

In a preferred embodiment of the method according to the invention step d) is performed by means of laser ablation.

It is preferred in step d) to make use of a laser for the purpose of arranging the surface structure. The use of a laser is cheaper in use than other methods such as the use of a carrier, such as a film, in which the surface structure is defined, since in this latter case this substantially increases the costs of the film.

In a preferred embodiment of the method according to the invention the layer and/or the base are heated during step a).

The heating of the layer and/or the base during arranging of the layer will result in this layer beginning to flow, so that it is more easily able to take on the shape of the base and/or the layer on the base on which it is arranged. A good bond will hereby be formed between the layers during the curing. This is particularly important for the subsequent layer when the base or the layer on the base over which the subsequent layer is arranged is provided with a surface structure, more particularly grooves. This temperature preferably lies between 80° C. and 130° C., for instance more than 100° C.

In a preferred embodiment of the method according to the invention the layer is pressed against the base during step a), for instance with a pressure of between 5 kg/cm$^3$ and 40 kg/cm$^3$, preferably between 10 kg/cm$^3$ and 30 kg/cm$^3$ and preferably between 18 kg/cm$^3$ and 20 kg/cm$^3$.

Pressing the layer against the base under pressure is also important for allowing different layers to fuse and for strengthening the connections between the layers during curing. It has been found here that said pressures produce good results. The pressing therefore preferably takes place in combination with the above stated heating of the layer.

The way in which the pressure is exerted is in principle not limited to a specific method, but in a preferred embodiment of the method according to the invention the pressing takes place with a roller, particularly a roller with a diameter smaller than a diameter of the base.

Using a roller enables the layer to be arranged on the base with a uniform pressure. This also simplifies the exertion of pressure relative to other methods. A roller with a diameter smaller than this diameter of the base is easily able to reach said pressures. The diameter of the roller is for this purpose for instance a maximum of 20 centimetres, preferably a maximum of 10 centimetres, more preferably about 5 centimetres.

In a preferred embodiment of the method according to the invention the method comprises prior to step a) a step e) of measuring the geometry of the base and storing the measured geometry.

The measuring and storing of the geometry of the base can be used to control the method, for instance because the process accuracy can be increased thereby. This is particularly advantageous when, as described below, the base is a used tyre, because the geometry thereof will generally differ per product.

In a preferred embodiment of the method according to the invention the method comprises a step f) of comparing the measured and stored geometry to a desired geometry, and of:

determining the number of layers to be arranged in step a) on the basis of the comparison, and/or performing step b) on the basis of the comparison.

With the measured and stored geometry it is firstly possible to determine the number of layers needed to obtain a tyre with a desired thickness and/or desired profile. Additionally or alternatively, this geometry can also be used to precisely determine where the material must be removed in step b). This enhances the accuracy of the method and thereby increases the quality of the final product.

In a preferred embodiment of the method according to the invention the base is a used tyre.

Although the method according to the invention can be applied to construct any type of tread, it has been found that the method is eminently suitable for constructing a tread on a used tyre, for instance a worn tyre. Used tyres can be renovated in this way, thus extending their lifespan. The overall volume of tyres having to be destroyed in an incinerator will decrease as a result hereof.

Measuring the geometry prior to arranging of the layers is particularly advantageous in the case of used tyres, because they will have different geometries in each case, for instance as a result of a difference in type and/or wear pattern.

In a preferred embodiment of the method according to the invention the tyre profile present on the used tyre is measured in step e).

Despite wear, a used tyre will generally still have some degree of profile. Because this profile which is still present can be used to construct the tread in the method, this profile is preferably also measured, wherein it can likewise be stored. It is here for instance possible to measure the degree to which the profile has worn in sloping, convex or concave manner. The profile which is present can be used as said surface structure, but can additionally or alternatively form part of the pattern to be arranged later.

In a preferred embodiment of the method according to the invention the method comprises prior to step a) the step g) of cleaning the used tyre, preferably by means of laser ablation.

A used tyre, more particularly the tyre profile thereof, may comprise due to use thereof components which are foreign thereto, such as for instance pebbles. In order to be able to arrange the layers in a reliable manner it is important to clean the tyre prior to arranging the layers. Use can be made for this purpose of methods such as brushing, although laser ablation, in addition to brushing, is a highly suitable method because it can also remove the smallest particles. It is otherwise recommended to perform a verification step during and/or after the cleaning, in which step the cleaning is checked visually. Extraction is also recommended during this cleaning by means of laser ablation.

In a preferred embodiment of the method according to the invention the method comprises a step h) of uncuring the tread of the used tyre prior to step a).

Because the tyre becomes softer hereby, the layer to be arranged is better able to adhere. Heating of the layer and/or arranging of the layer under pressure, as described above, is for this reason likewise applied here.

In a preferred embodiment of the method according to the invention the uncuring takes place using microwave radiation.

A suitable method for uncuring relates to the application of microwave radiation, as is for instance applied in a microwave.

In a preferred embodiment of the method according to the invention the layer thickness of the layer lies between 30 and 120 µm, preferably between 60 and 110 µm and more preferably amounts to about 80 µm.

Although the layers can have a layer thickness of between 30 and 500 µm, it is preferred to have the thickness amount to a minimum of 60 µm because fewer layers are hereby needed to construct a tyre. At the same time, a thickness of a maximum of 120 µm is preferred because the removal with a laser is then easier, wherein a thickness of 110 µm is in that case preferred. The optimal layer thickness which takes both factors into account lies at around 80 µm.

In a preferred embodiment of the method according to the invention at least one of the steps b) and d) takes place with an infrared laser and/or a laser with a wavelength of about 400 nm.

Laser light with a wavelength of about 400 nm is here particularly advantageous because light of these wavelengths results in a limited heat development. As a result, the layer will age and/or become damaged and/or burn to more limited extent than if laser light of other wavelengths were used. This means that the layer which has cured to limited extent is better able to adhere to a subsequent layer to be arranged over this layer later.

In a preferred embodiment of the method according to the invention the method further comprises a step i) of determining a force distribution profile of forces exerted during use on the tyre to be constructed, wherein at least one of the steps b) and d) takes place on the basis of the force distribution profile determined in step i).

When the tyre comes into contact with the contact surface, such as a road surface, all manner of forces will be exerted on the tyre. In order to be able to optimally anticipate this, more particularly forces occurring inside the tread, it is advantageous to determine a force distribution profile on the basis of these forces, and to perform the construction of the tread, more particularly in the steps b) and/or d) of this method, on the basis of this force distribution profile. It can for instance be particularly important to strengthen the adhesion at positions where a high force is expected, such as for instance by arranging a surface structure there.

In a preferred embodiment of the method according to the invention the method further comprises a step j) of arranging at least one additive, preferably selected from an aluminium oxide and/or silicon and/or an aerosil, for instance aerosil 380 and/or a combination thereof. Another suitable additive is polyethylene with a layer of similar weight, for instance polyethylene 8203 by DSM.

Using additives it is possible to influence the properties of the tread and thereby the tyre. These can be additives which are applied as part of the layer and are thus embedded therein, or additives which are applied separately and therefore between the layers. Aluminium oxide and silicon are for instance suitable for increasing the strength of the tyre, which may reduce wear.

In a preferred embodiment of the method according to the invention the method further comprises a step k) of arranging a wear-resistant top layer.

Arranging a wear-resistant top layer is an effective measure for increasing the durability of the tyre. This top layer can comprise rubber, although this need not always be the case. It is possible here that step k) is performed by applying an additive, so that this step k) thereby forms at least part of or even corresponds with step j).

In a preferred embodiment of the method according to the invention the method further comprises a step l) of wholly curing the plurality of layers.

When a step l), wherein a plurality of layers is wholly (or at least maximally) cured, is also provided in the method in addition to the step c), the curing is then increased further, making the tyre stronger. It is hereby also possible to opt to limit the curing in the step c), which can have a positive effect on the adhesion of subsequent layers to this layer.

The object of the invention is further achieved with a device comprising a preferably cylindrical base and a control configured to perform the method according to the invention on a base.

The method according to the invention is preferably performed with a device provided with a control which is configured to perform the method. This makes it easier to perform the method.

The object of the invention is further achieved with an uncured rubber strip suitable for use in the method according to the invention.

In a preferred embodiment of the strip according to the invention the strip has a layer thickness of between 30 and 120 μm, this preferably lying between 60 and 110 μm, and more preferably amounting to about 80 μm.

In a preferred embodiment of the strip according to the invention the strip comprises a start and end zone, at least one zone of which has a layer thickness decreasing relative to the layer thickness.

In a preferred embodiment of the strip according to the invention the strip is arranged on a carrier, preferably a film, particularly a polyester film.

In a preferred embodiment of the strip according to the invention a side of the carrier directed toward the layer defines a negative of a or the surface structure.

The advantages of the strip have already been elucidated with reference to the method according to the invention and likewise apply for the strip according to the invention.

BRIEF DESCRIPTION OF THE DRAWINGS

The invention is elucidated on the basis of a number of embodiments with reference to the drawings, in which.

DETAILED DESCRIPTION OF THE INVENTION

Figure 1:
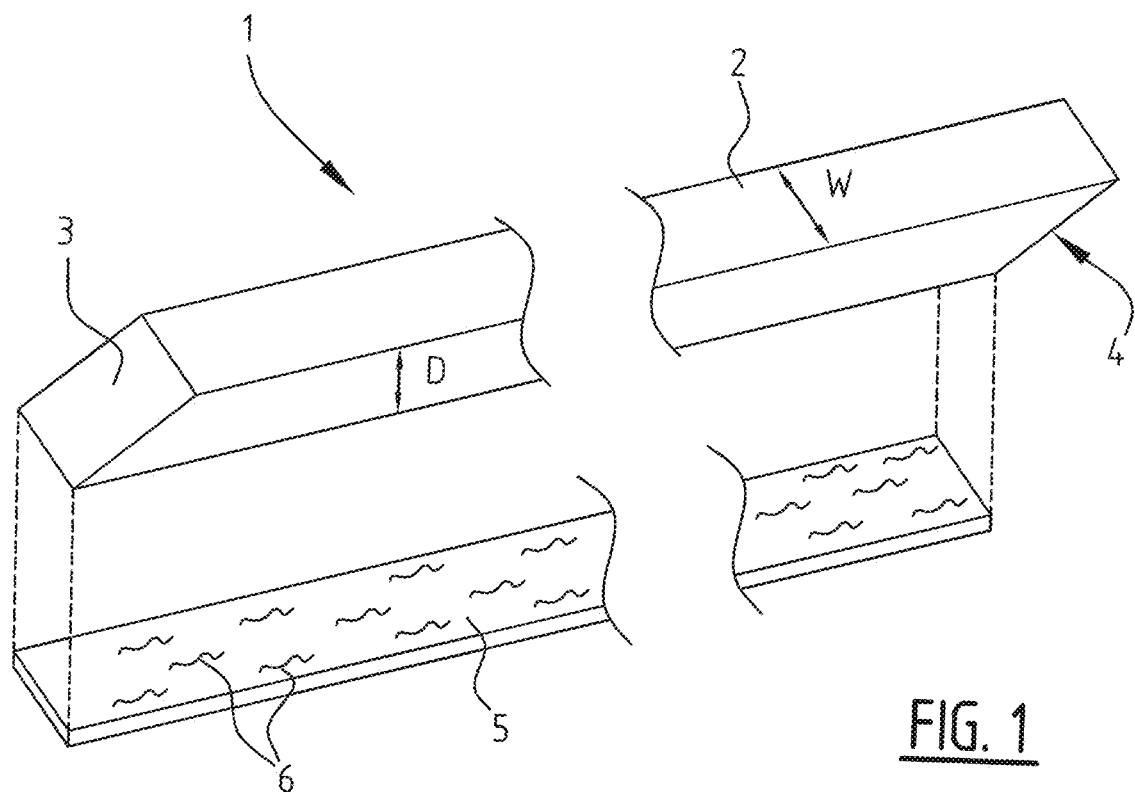
FIG. 1 shows an exploded view of a strip according to the invention.

FIG. 1 shows an uncured rubber strip 1 with a central zone 2 and at the respective outer ends a start zone 3 and an end zone 4. Central zone 2 has a thickness D of 80 μm, while the thickness of start zone 3 and end zone 4 decreases to a thickness of (almost) zero. Strip 1 is provided on one of the sides with a polyester film 5 which extends from start zone 3 to end zone 4. In this case a negative of a surface structure 6 to be formed is arranged in the side of the film directed toward strip 1. The tyre has a width W corresponding to the width of a tyre, such as a car tyre.

Figure 2:
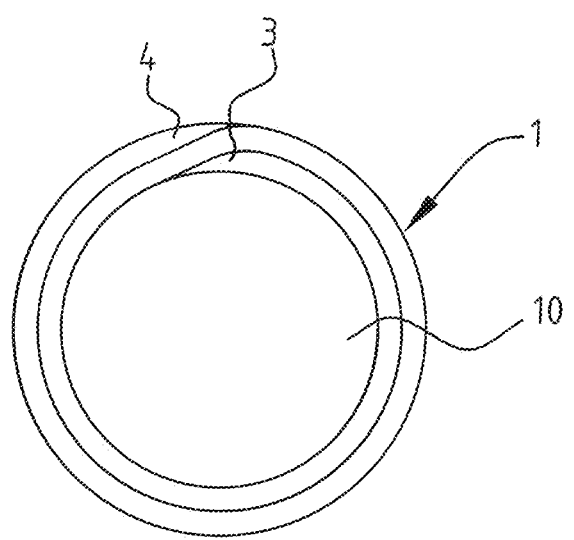
FIG. 2 shows a side view of the strip according to FIG. 1, arranged on a base.

FIG. 2 shows the strip 1 arranged on a cylindrical base 10. As can be seen, strip 1 is wrapped round base 10 multiple times, in this case twice. A greater number of times will however generally be opted for in practice. Start zone 3 and end zone 4 ensure here that tread constructed on base 10 is smooth.

Figures 3A, 3B, 3C:
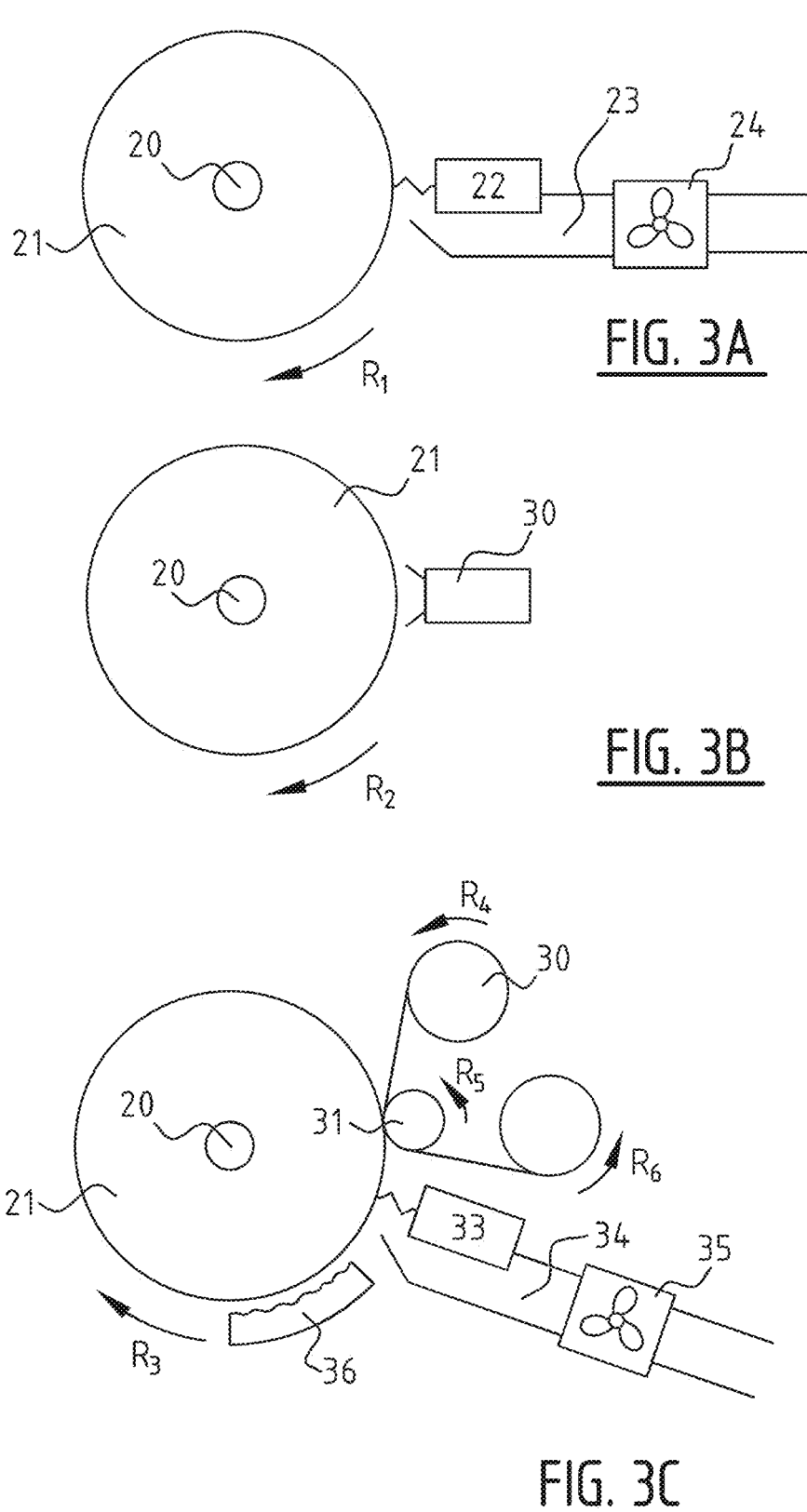
FIGS. 3A-3C show components of a device configured to perform a method according to the invention.

FIG. 3A shows a used car tyre 21 arranged on a base 20. Provided along the external surface of tyre 21 is a laser 22, which can on the one hand be used to clean tyre 21 and on the other to arrange a surface structure in the external surface. The base 20 is configured to rotate the tyre around its axis in the direction $R_1$. Provided under the laser is an extraction channel 23 connected to a fan 24 and configured to discharge material coming from tyre 21 as a result of the action of laser 22.

In FIG. 3B this tyre 21 is then shown in the vicinity of a measuring device 30 for the purpose of measuring the profile present on the used tyre 21. The measuring device 30 can for instance comprise a camera. Axis 20 rotates in direction $R_2$.

In FIG. 3C this tyre 21, rotatable in direction $R_3$, is shown with a roll 30 of cured rubber, such as for instance strip 1 of FIG. 1. Strip 1 is carried toward the surface of tyre 21 in direction $R_4$ by rotation of roll 30, where it is pressed against the surface of tyre 21 in direction $R_5$ by rotation of pressure roller 31. Pressure roller 31 has a diameter smaller than the diameter of tyre 21. The film layer 5 arranged on one of the sides of strip 1 is wound onto a roll 32 by rotation of this roll 32 in direction $R_6$. Tyre 21 with the layer arranged thereon is then carried to laser 33, which removes material from the arranged layer for the purpose of forming a predetermined pattern. Laser 33 is here also provided with an extraction channel 34 with a fan 35. After this, the tyre with the pattern arranged therein will be carried to a curing station 36 which cures the arranged layer at least partially.

The components as shown in FIGS. 3A, 3B and 3C can of course overlap. Laser 22 can thus for example be the same laser as laser 33 and/or fan 35 can be the same fan as fan 24.

Figure 4:
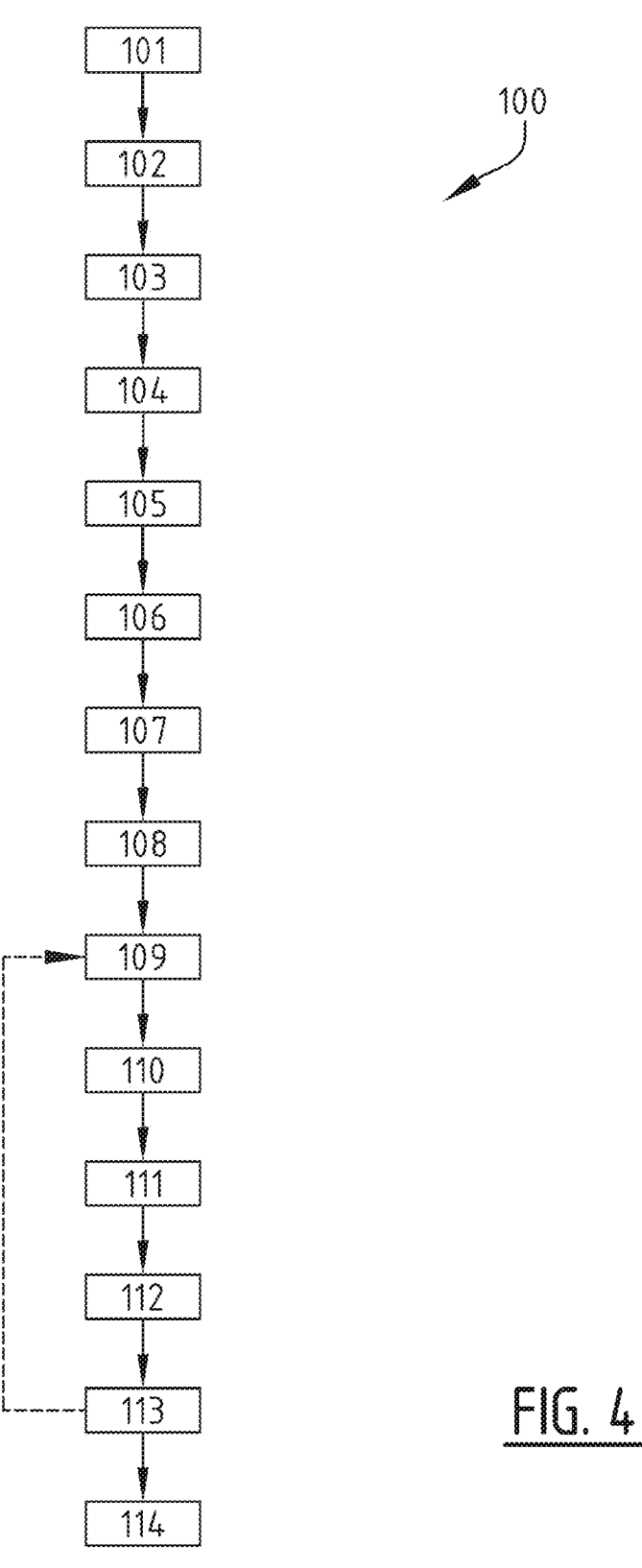
FIG. 4 shows a flow diagram of a method according to the invention.

FIG. 4 shows a method 100 according to the invention. The method comprises the step 101 of selecting a used tyre, which forms the basis for the method, followed by the step 102 of cleaning the used tyre. In step 103 a desired geometry for the used tyre is determined, after which or wherein in step 104 a force distribution profile is determined on the basis of the desired geometry. Step 105 comprises of measuring the geometry of the used tyre, including the residual profile, and of storing the measured geometry, after which the measured and stored geometry is compared to the desired geometry in step 106. In step 107 the number of layers to be arranged and the pattern to be arranged are determined on the basis of the determined geometry and the force distribution profile, after which the tread of the used tyre is uncured in step 108. A number of arranging cycles consisting of the steps 109-113 then follows, wherein step 109 comprises the step of arranging a layer of uncured rubber with a layer thickness of 80 μm on the used tyre, wherein the layer is pressed against the tyre and wherein the tyre is heated, step 110 comprising the step of then removing material from the layer for the purpose of arranging a predetermined pattern, and step 111 comprises the step of partially separately curing the layer, after which a surface structure is arranged in the layer in step 112, and after which an additive is applied to the layer in step 113. When the final layer is reached, the whole tyre can be cured in step 114. The step 112 will otherwise be absent in the final cycle.

The invention is otherwise not limited to the foregoing embodiments. The method is thus suitable for constructing treads on all manner of tyres, and is not limited to car tyres. It is not limited to renovation of used tyres either, but is also suitable for constructing the tread of new tyres.

The scope of protection is therefore defined on the basis of the following claims.

The invention claimed is:

1. A method for constructing a tread of a tyre, comprising:

a) arranging a plurality of layers of uncured rubber with a layer thickness per layer of between 30 and 500 μm on a base;

b) removing material from each layer for a purpose of arranging a predetermined pattern using laser ablation and before arranging a subsequent layer over each layer; and c) separately curing each layer by converting at most 70% of the uncured rubber over the entirety of a surface of each layer.

2. The method according to claim 1, wherein step a) comprises wrapping the base multiple times with one strip for the purpose of forming the plurality of layers.

3. The method of claim 2 wherein the strip comprises a start and end zone, of which at least one zone has a layer thickness decreasing relative to the respective layer thickness.

4. The method according to claim 1, wherein the method comprises step c) takes place after step b).

5. The method according to claim 1, wherein in step a) a rubber strip is arranged from a carrier.

6. The method according to claim 5, wherein the method comprises a step d) of arranging a surface structure in at least a part of the layers and/or the base.

7. The method according to claim 6, wherein the method comprises a step selected from the group consisting of: at least one of the steps b) and d) takes place with an infrared laser or a laser with a wavelength of about 400 nm, a step i) of determining a force distribution profile of forces exerted during use on the tyre to be constructed, and combinations thereof, and optionally at least one of the steps b) and d) takes place on the basis of the force distribution profile determined in step i).

8. The method according to claim 6, wherein a side of the carrier directed toward the respective layer defines a negative of the surface structure.

9. The method according to claim 1, the method comprises a step selected from the group consisting of:

the layers and/or the base are heated during step a), the layers are pressed against the base during step a), the layers are pressed against the base during step a) with a pressure of between 5 kg/cm³ and 40 kg/cm³, the layers are pressed against the base during step a) with a pressure between 10 kg/cm³ and 30 kg/cm3, the layers are pressed against the base during step a) with a pressure between 18 kg/cm³ and 20 kg/cm³, the layers are pressed against the base during step a) with a roller, and the layers are pressed against the base during step a) with a roller with a diameter smaller than a diameter of the base.

10. The method according to claim 9, wherein the base is a used tyre.

11. The method according to claim 10, wherein a tyre profile present on the used tyre is measured in step e).

12. The method according to claim 1, wherein the method comprises prior to step a) a step e) of measuring a geometry of the base and storing the measured geometry.

13. The method of claim 12 wherein the method comprises a step f) of comparing the measured and stored geometry to a desired geometry, and a step selected from the group consisting of: a step of determining a number of layers to be arranged in step a) based on the comparison, a step of performing step b) on the basis of the comparison, and combinations thereof.

14. The method according to claim 12, wherein the tyre is a used tyre and the method comprises a step selected from the group consisting of:

prior to step a) a step g) of cleaning the used tyre, prior to step a) the step g) of cleaning the used tyre by laser ablation, a step h) of uncuring the tread of the used tyre prior to step a), the step h) of uncuring the tread of the used tyre prior to step a) and the uncuring takes place using microwave radiation, and combinations thereof.

15. The method according to claim 1, further comprising a step selected from the group consisting of:

a step j) of arranging at least one additive, optionally selected from an aluminium oxide, silicon, a polyurethane, and/or a combination thereof, a step k) of arranging a wear-resistant top layer, a step l) of wholly curing the plurality of layers, and combinations thereof.

16. The method according to claim 1, wherein said thickness per layer is between 30 and 120 μm.

* * * * *